Feb. 24, 1970   J. BLUM   3,496,819
TISSUE SECTIONER
Filed Oct. 26, 1967   8 Sheets-Sheet 1
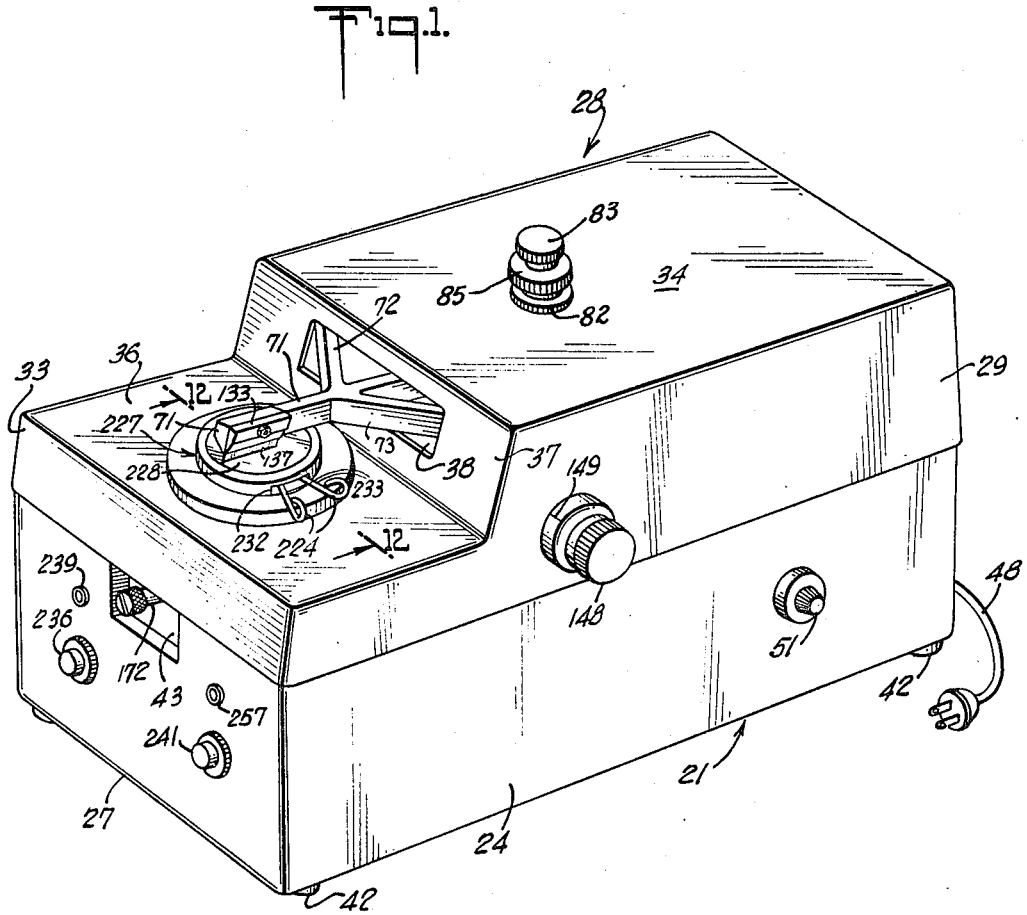
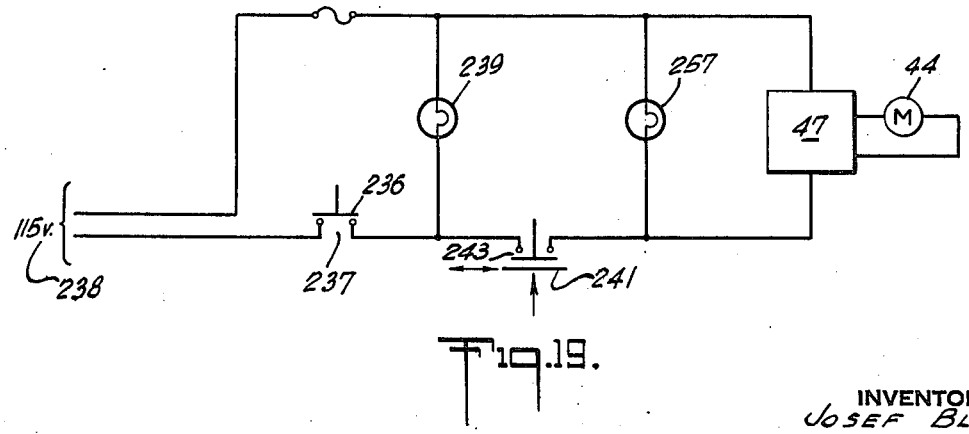
INVENTOR
JOSEF BLUM
BY
ATTORNEY

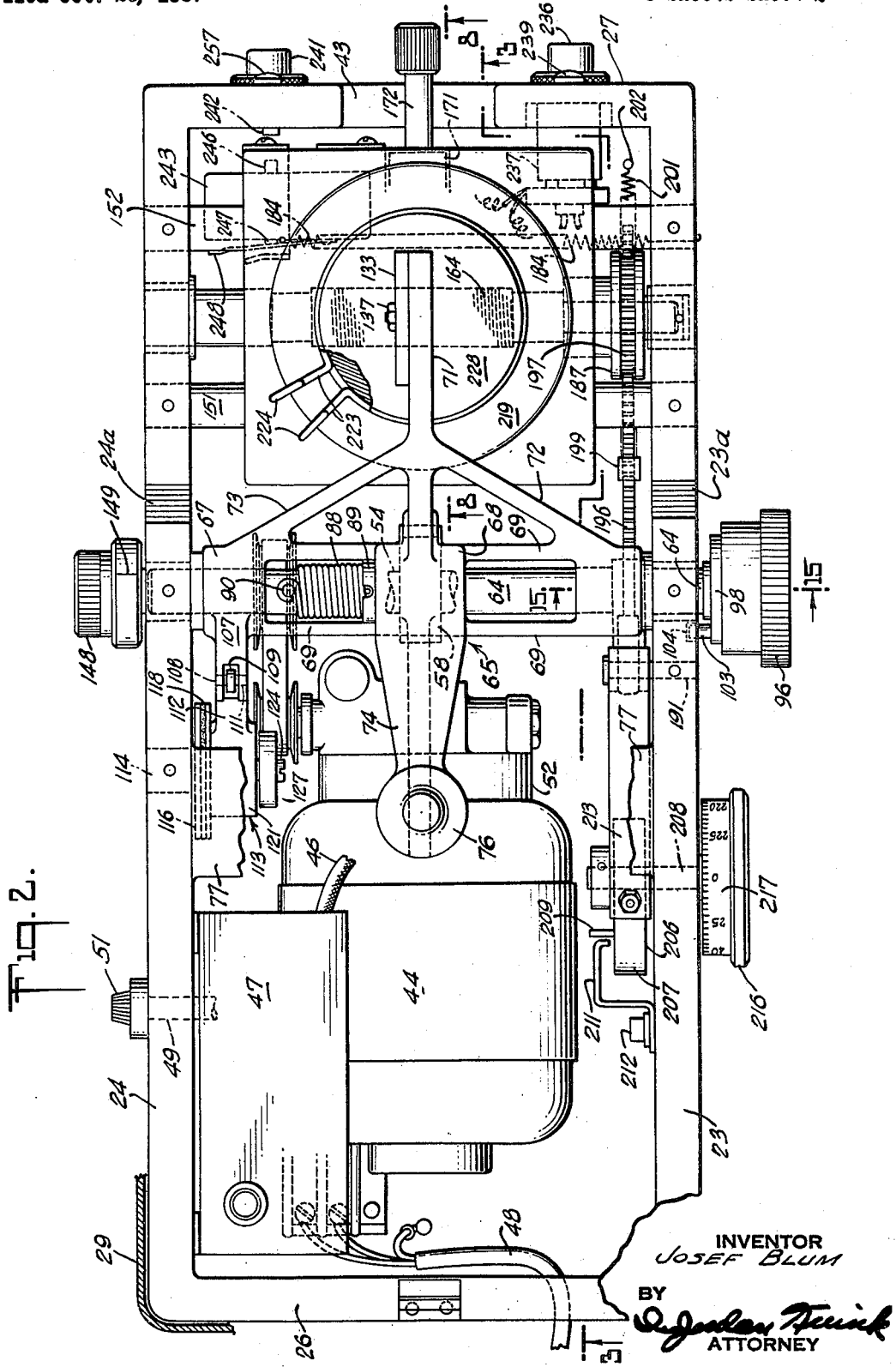

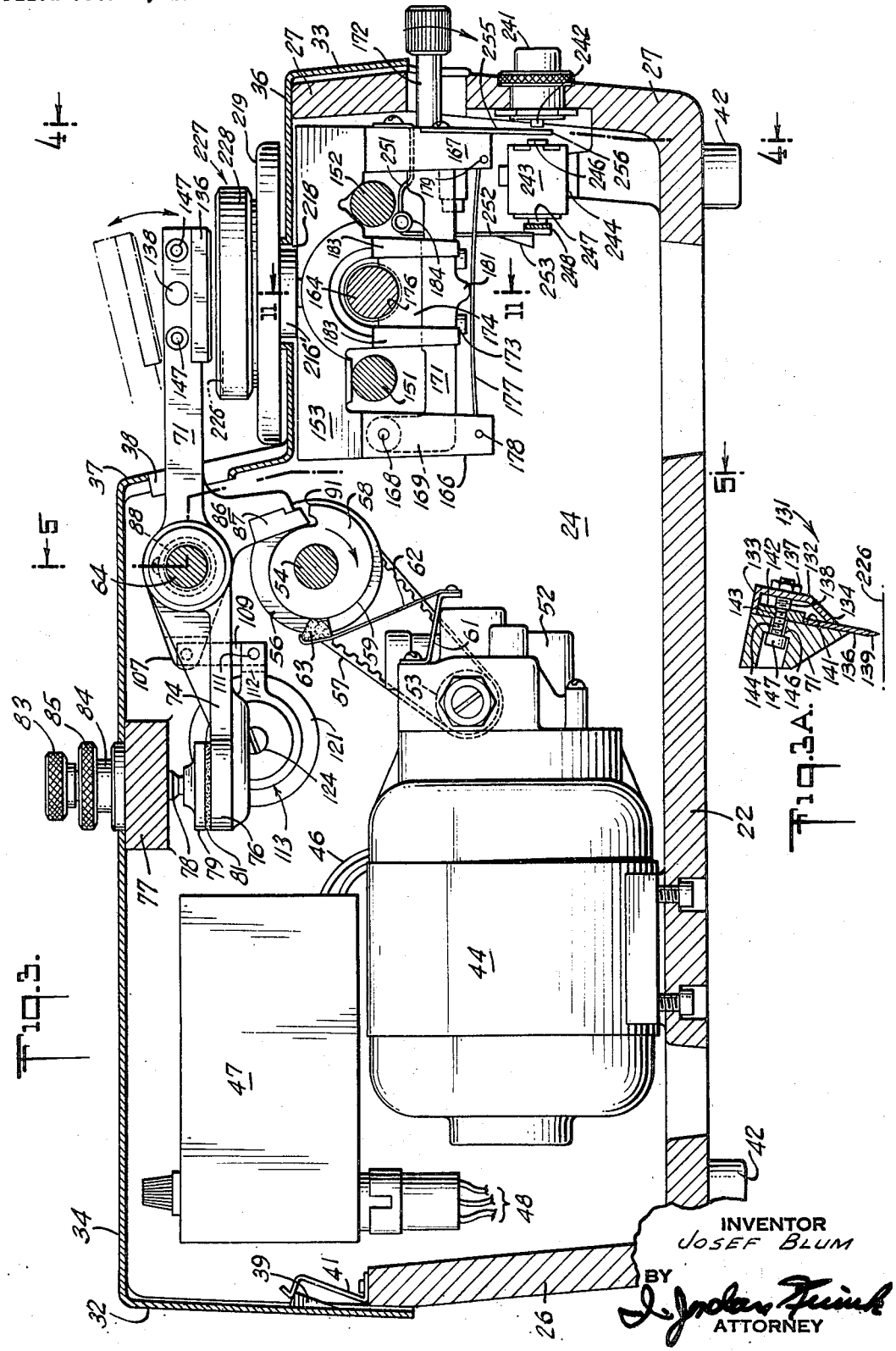

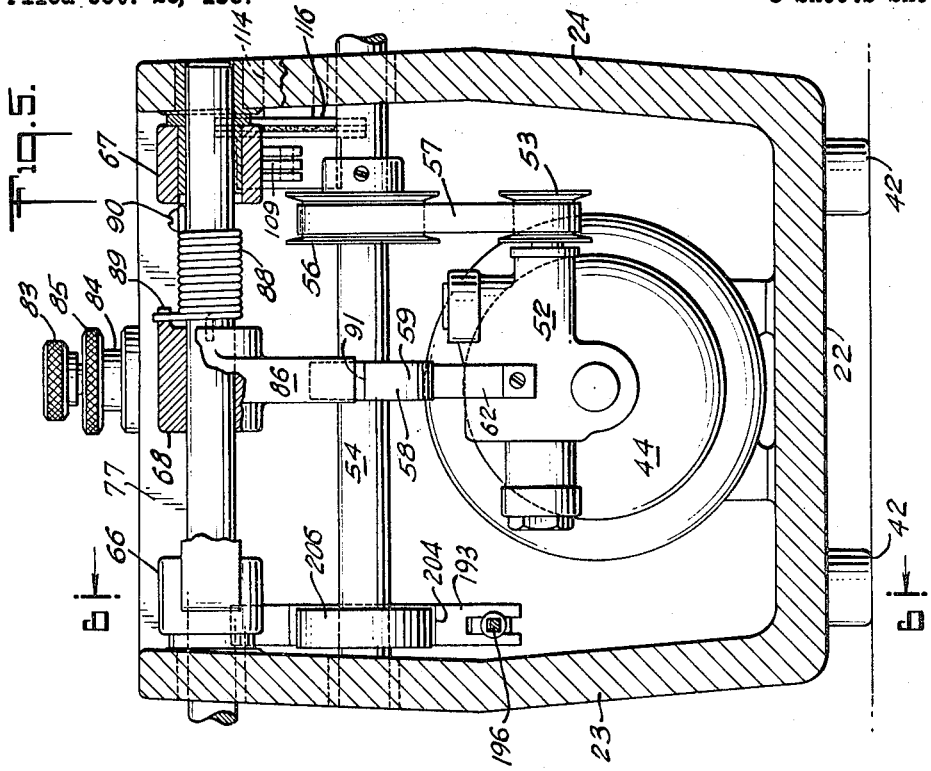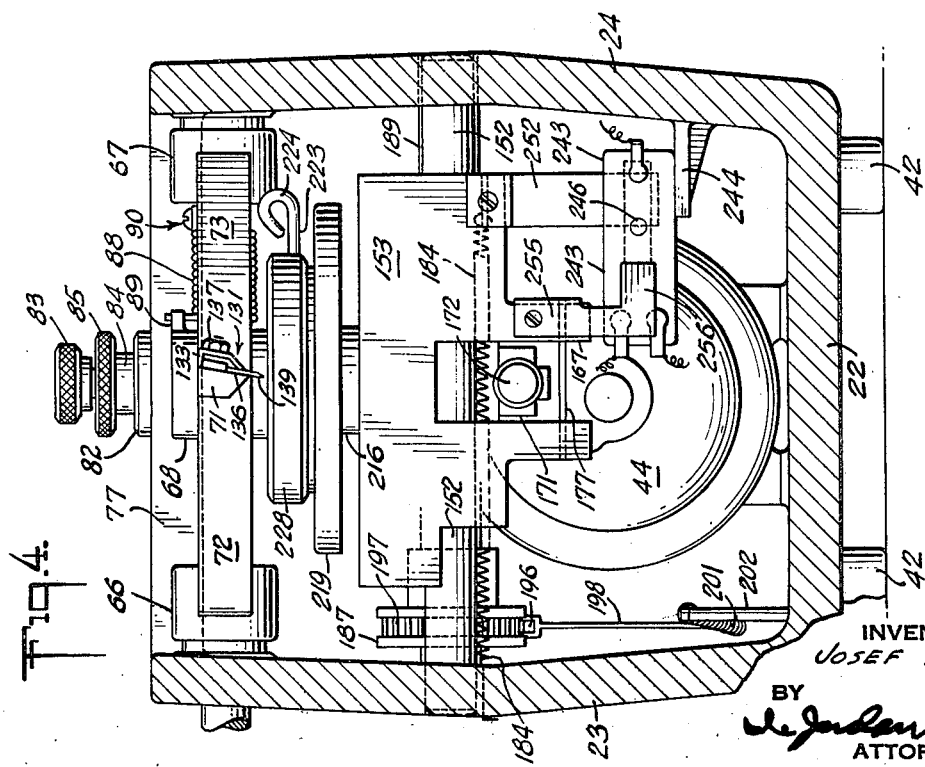

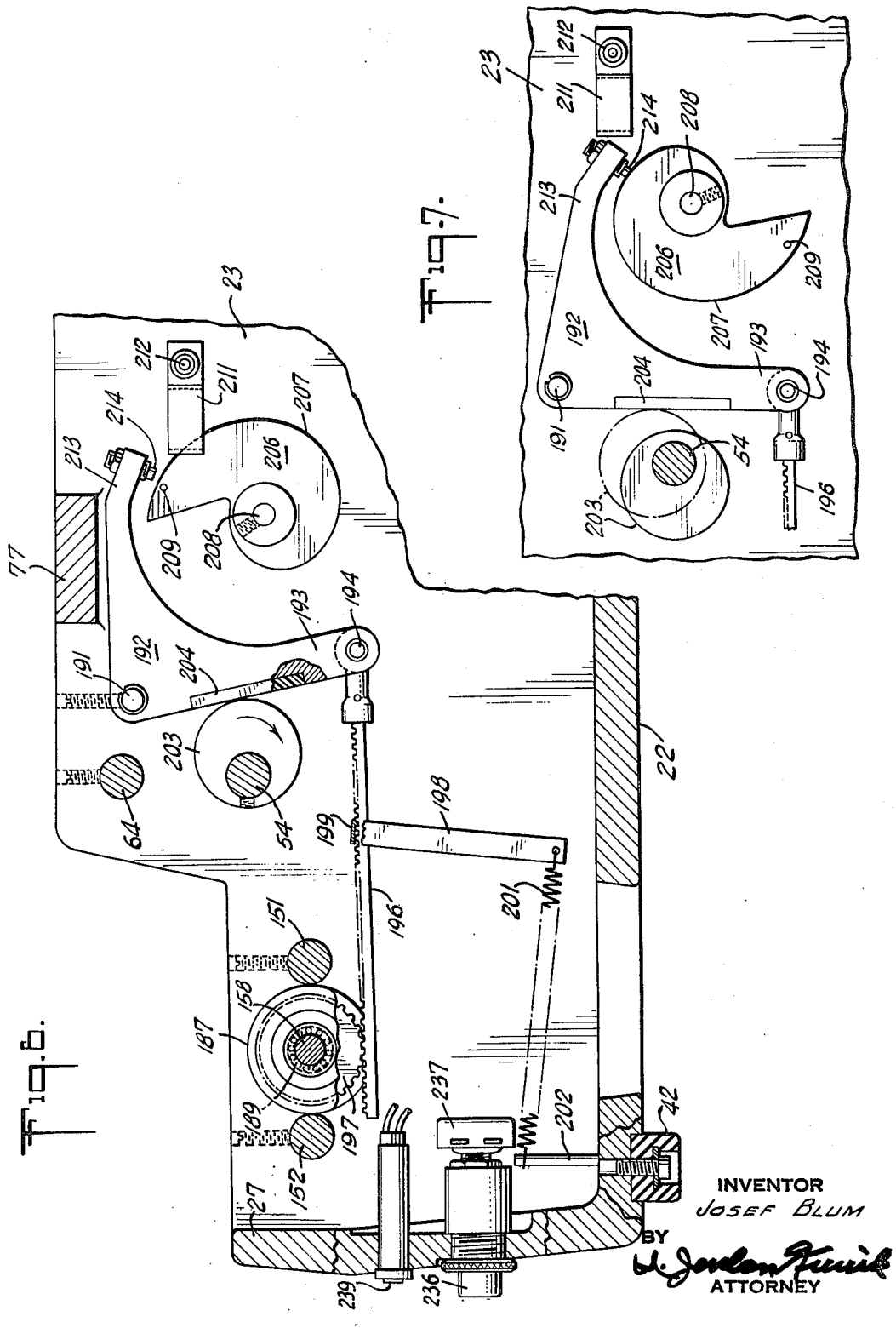

INVENTOR
JOSEF BLUM
ATTORNEY

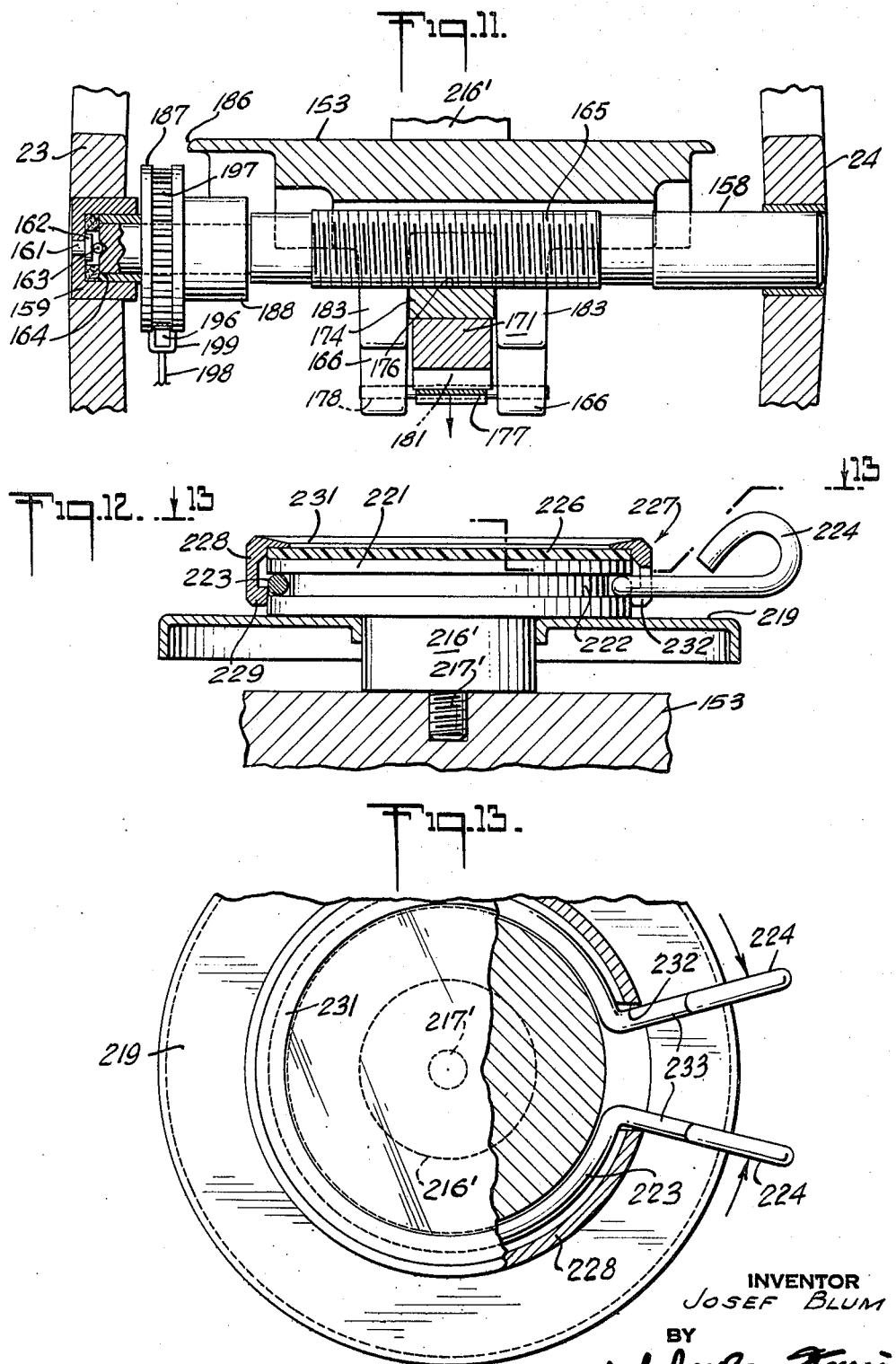

Feb. 24, 1970    J. BLUM    3,496,819
TISSUE SECTIONER
Filed Oct. 26, 1967    8 Sheets-Sheet 8
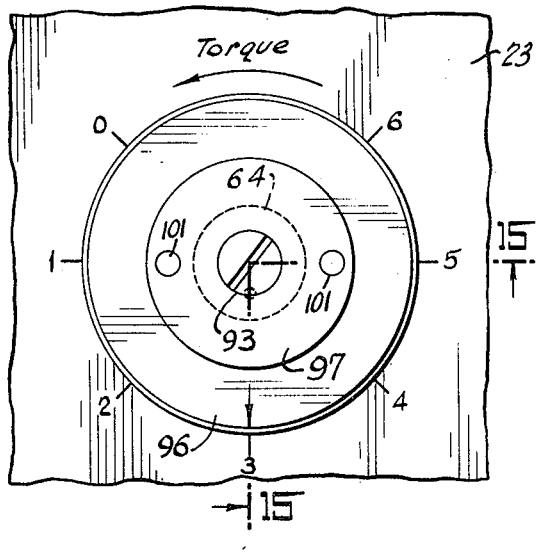
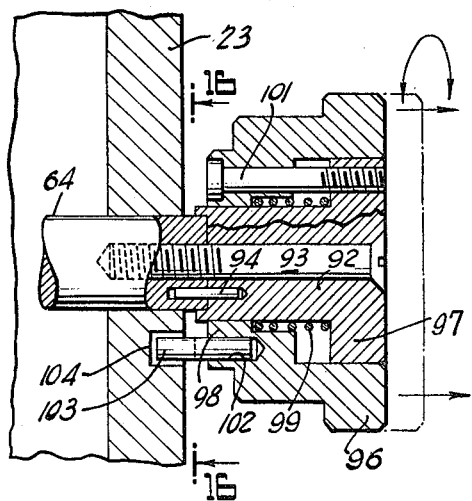
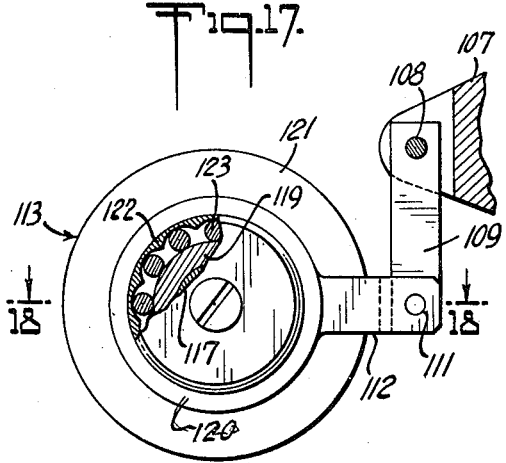
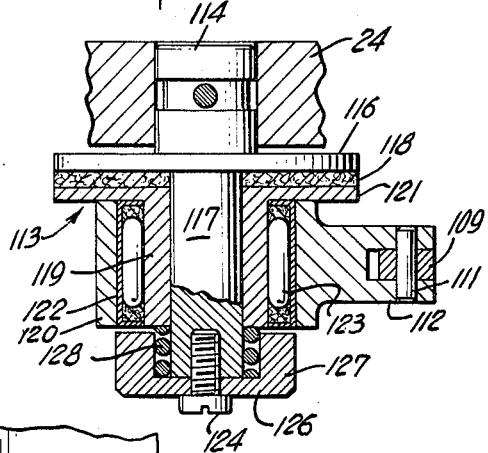
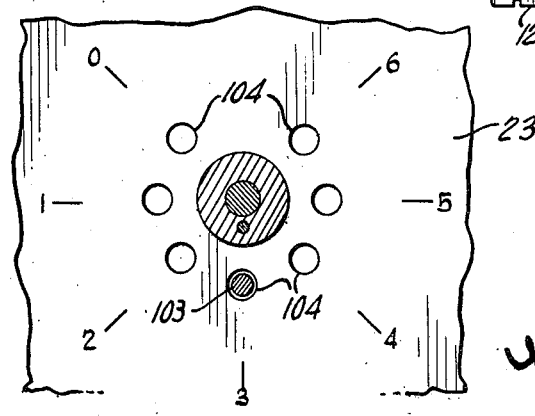
INVENTOR
JOSEF BLUM
BY
ATTORNEY

United States Patent Office 3,496,819
Patented Feb. 24, 1970

3,496,819
TISSUE SECTIONER
Josef Blum, Norwalk, Conn., assignor to Ivan Sorvall, Inc., Norwalk, Conn., a corporation of Connecticut
Filed Oct. 26, 1967, Ser. No. 678,226
Int. Cl. B26d 5/22, 5/08
U.S. Cl. 83—247      23 Claims

ABSTRACT OF THE DISCLOSURE

Apparatus for rapid and efficient sectioning of biological tissues for examination and study by light or electron microscopes in the field of histology, cytochemistry and the like. Apparatus includes improved means for varying tissue thickness, for adapting cutting energy to the tissue characteristics, and incorporates several safety factors for preventing damage to the apparatus. Improved means are also included for easy replacement of specimens and for adjusting the controls and operating components of the apparatus.

BACKGROUND OF THE INVENTION

Field of the invention

This invention relates to biological research apparatus and, more particularly, to a device for rapidly cutting biological tissue into thin sections of "non-fixed tissue" without freezing for research analysis or clinical examination. The apparatus is useful in the preparation of tissue sections in the range of approximately 5 to 230 microns in thickness.

Description of the prior art

Previous instruments of the type described and claimed herein have lacked satisfactory controls and safeguards whereby vibration of the cutting arm and translational disturbances have resulted in the production of non-uniform tissue sections and scattering thereof. Previous machines have lacked means for preventing accidental damage to the traverse mechanism of the specimen stage and to the cutting knife. They have also required excessive and time consuming manipulations for conducting cutting operations on a succession of specimens. Also lacking have been quick and easy adjustment means for varying the operations of the apparatus.

SUMMARY OF THE INVENTION

The present invention described and claimed herein incorporates means for rapidly and uniformly sectioning biological tissues for light or electron microscope study wherein a rapidly oscillating knife is operative upon a specimen mounted on an intermittently moving stage. Improved means are provided for adjusting the location of the cutting edge of the knife relative to the specimen stage as well as means for preventing chattering or vibration of the knife-holding element, the latter being accomplished by clutch dampening means connected to the oscillating knife-holding cutting arm. Means are also provided for varying the thickness of the section cut by the knife, said means being operable even during the cutting action of the apparatus when sections of different thickness are desired from the same specimen.

Furthermore, safety means are incorporated into the specimen stage traverse mechanism whereby the electrical circuitry powering the apparatus is automatically shut off when the specimen stage reaches a predetermined limit, thereby preventing shock impact of the specimen stage against a wall of the apparatus, and preventing the stripping of interengaging screw and nut threads.

Means are also provided for the rapid placement and replacement of specimen-holding discs on the movable specimen stage so that successive specimens may be quickly processed by the apparatus without delay.

Means are also provided for raising the cutting arm assembly for easy and safe specimen sample placement and adjustment as well as for replacement and adjustment of the cutting knife located in said assembly. Means are also provided for easily adjusting the striking force of the cutting arm in which the cutting knife is located in order to accommodate the action to tissues of varying thickness and toughness.

The resetting of the specimen stage to a starting position in the apparatus is accomplished instantaneously by a disengaging lever which obviates the time consuming necessity in previous instruments of manually rewinding a lead screw to bring the specimen stage back to the original starting position for processing a fresh specimen.

It is to be understood that the principles of the invention herein may be utilized for purposes other than processing of biological materials and specimens, and that the apparatus may be adapted for use where a stage traverses in steps from one side of frame to another while another component of the apparatus is operable substantially perpendicularly relative to said stage during the successive periods when said stage is stationary between stepping movements.

BRIEF DESCRIPTION OF THE DRAWINGS

FIG. 1 is a perspective view of the apparatus of the present invention;

FIG. 2 is an enlarged top view of the apparatus shown in FIG. 1 with the cover removed and exposing the interior components of the apparatus, some parts being broken away, some parts being omitted;

FIG. 3 is a section view taken on approximately line 3—3 of FIG. 2, some parts being shown in elevation and some parts being omitted;

FIG. 3A is a greatly enlarged section view, some parts being shown in elevation, of the knife holder of the apparatus, said section being taken through the vertical center of the knife blade shown in FIG. 3;

FIG. 4 is a view taken approximately on line 4—4 of FIG. 3, some parts being shown in elevation and some parts being omitted;

FIG. 5 is a section view taken approximately on line 5—5 of FIG. 3, some parts being omitted and some parts being shown in elevation;

FIG. 6 is a view taken approximately on line 6—6 of FIG. 5, some parts being omitted and some other parts being shown in elevation;

FIG. 7 is a fragmentary view of a portion of FIG. 6 showing the thickness control apparatus in a predetermined position different from that shown in FIG. 6;

FIG. 11 is a greatly enlarged fragmentary view taken on line 11—11 of FIG. 3, some parts being shown in elevation and some parts being omitted;

FIG. 12 is a greatly enlarged vertical central section view, partly in elevation, of the specimen stage and support structure therefor;

FIG. 13 is a fragmentary view, partly broken away, taken approximately on line 13—13 of FIG. 12;

FIG. 14 is an enlarged fragmentary side view of a portion of the apparatus where the tension control deview is located;

FIG. 15 is a section view taken on line 15—15 of FIG. 14, some parts being shown in elevation and other parts broken away;

FIG. 16 is a view taken on line 16—16 of FIG. 15;

FIG. 17 is an enlarged fragmentary elevation view of a portion of the cutting arm clutch mechanism, fragmentary portions of which are shown in section;

FIG. 18 is a section view taken on line 18—18 of FIG. 17, and

FIG. 19 (sheet 1) is a schematic diagram of the electrical circuit which controls the operation of the apparatus of the present invention.

DESCRIPTION OF THE PREFERRED EMBODIMENTS

Figure 8:
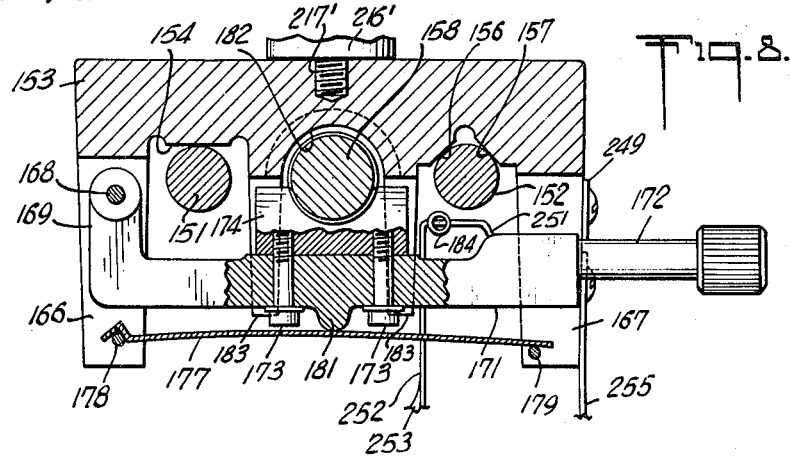
FIG. 8 is an enlarged fragmentary view taken approximately on line 8—8 of FIG. 2, some parts being broken away and some parts being shown in elevation.
Figure 9:
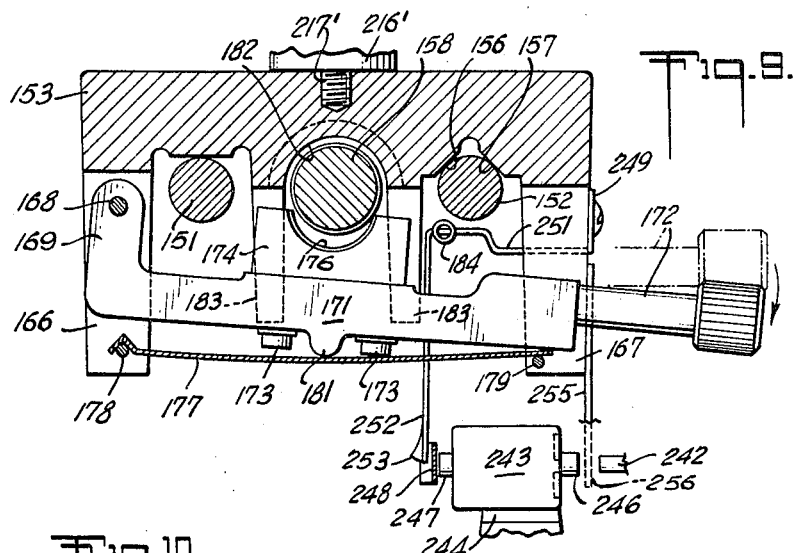
FIG. 9 is similar to FIG. 8 showing the disengagement of several of the components, and further illustrating a portion of the electrical switching system of the apparatus.
Figure 10:
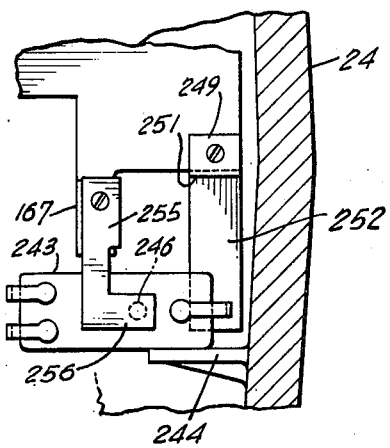
FIG. 10 is an enlarged fragmentary detail front view of a portion of FIG. 4 illustrating the shut off and re-set mechanisms as shown in a side view in FIG. 9.

Referring now to the drawings in detail, the apparatus of the present invention is mounted within a box-like rectangular housing, generally designated 21, made of an aluminum casting or the like, having a floor 22, side walls 23 and 24, and somewhat shorter end walls 26 and 27. See FIGS. 1, 2 and 3.

The forward portions of side walls 23 and 24 are reduced in height substantially coextensive with front end wall 27, the top front and rear portions of walls 23 and 24 being joined by slopes 23a and 24a, respectively. See FIGS. 2 and 3.

Mounted over the top of housing 21 is a rectangular sheet metal cover, generally designated 28, having side walls 29, end walls 32 and 33, a top 34, and a lower deck 36. In some embodiments cover 28 may be made in separate forward and rear sections. Integrally formed between top 34 and deck 36 is a sloping wall 37 having a rectangular aperture 38 through which the oscillating cutting arm of the apparatus extends. Cover 28 is secured by snap action to housing 21 by the interaction of detent bracket 39 connected to the interior surface of rear end wall 32 of cover 28 and spring latch 41 connected to the top edge of housing rear wall 26 (FIG. 3).

Housing 21 stands upon a plurality of spaced rubber bumpers 42 located on the bottom surface of floor 22 and secured thereto by suitable threaded bolts or the like. Front wall 27 has a rectangular aperture 43 (FIGS. 1 and 3) through which one of the control elements of the apparatus protrudes.

Mounted in the interior of housing 21 and secured to floor 22 by means of bolts or the like is an electric motor 44 connected by suitable wiring in cable 46 to a speed control assembly 47. See FIGS. 2 and 3. Speed control assembly 47 is connected by suitable wiring in cable 48 to a source of electric power. Connected to the interior of speed control assembly 47 is a control shaft 49 which extends through wall 24 of housing 21, and terminates in knob 51 which is manipulated to determine the speed at which the apparatus operates. Speed control devices as exemplified by control 47 are well known in the art.

Mounted on the forward end of motor 44 is a speed reducing gear train assembly 52 to which is connected a drive pulley 53. Rotatably mounted in suitable respective journalley bearings in walls 23 and 24 is a driven cam shaft 54 to which is connected a driven pulley 56. Connected between drive pulley 53 and driven pulley 56 is a timing belt 57 whereby the operation of motor 44 causes cam shaft 54 to rotate at a speed determined by the setting of control knob 51.

Mounted intermeditae the ends of shaft 54 and rotated thereby is a cam 58 having a spirally shaped cam surface 59. See FIG. 3. Connected to speed reduction assembly 52 is a bracket 61 on which is mounted one end of spring blade 62, to the other end of which is connected an oil pad 63 made of suitable sponge-like material containing a lubricant, said oil pad 63 being urged by blade 62 continuously against the spiral surface 59 of cam 58.

Located above cam 54 and mounted rotatably in suitable bearings in walls 23 and 24 is a cutting arm shaft 64. Mounted pivotably around shaft 64 is a cutting arm assembly, generally designated 65, comprising three spaced apart journals 66, 67 and 68, coaxially surrounding and freely rotatable around said shaft with a close sliding fit. See FIGS. 2, 3, 4 and 5. Integrally joining journals 66, 67 and 68 are one or more spaced apart bars 69 whereby said journals are caused to rotate in unison. Integrally formed with central journal 68 is a forwardly extending cutting arm 71 intermediate the ends of which are a pair of obliquely and oppositely extending integrally formed buttress elements 72 and 73 integrally connected also to journals 66 and 67, respectively.

Integrally formed with journal 68 is a rearwardly extending leg 74 which terminates in a circular flat-topped stub 76 that serves as a stop abutting element for the cutting arm assembly which, including journals 66, 67, 68 and cutting arm 71, and buttress elements 72 and 73, may be made of a unitary casting of aluminum or other suitable strong lightweight alloy.

Positioned directly above stub 76 and secured between walls 23 and 24 is a bar 77 through which extends threaded shaft 78, to the lower end of which is connected a circular stop element 79 to the bottom surface of which is attached a shock absorbing pad 81 made of hard rubber, leather, or the like.

Connected to bar 77 is a disc 82 which extends through a suitable aperture in cover top 34 and serves as a locating element between bar 77 and top 34. Threaded shaft 78 extends through disc 82, above cover top 34 and terminates in a knurled adjustment screw knob 83 which provides for manual rotation of shaft 78 to adjust the height of the bottom stop surface of pad 81 to the desired location at which to limit the pivoting motion of cutting assembly 65. Also threadably engaged around shaft 78 is locking ring 84 which, by means of its knurled knob 85, is manipulated to lock shaft 78 and concomitantly pad 81 in the desired position.

Cutting arm assembly 65 has an integrally formed downwardly and obliquely extending cam leg 86 which has a cam follower insert 87, made of Teflon or the like, which cooperates with the spiral surface 59 of cam 58 whereby the rotation of the latter produces the recurring and repeated pivoting motion of the cutting arm assembly 65. See FIG. 3.

While the rotation of cam 58 only produces a lifting action on the part of cutting arm 71, the energy for producing the downward cutting action of said arm in its downward pivoting motion is produced by torsion spring 88 coiled around shaft 64. See FIGS. 2 and 5. One end of torsion spring 88 is inserted in an aperture in boss 89 on journal 68 while the other end of said spring is mounted fast on shaft 64 by means of anchoring screw 90 or the like. Cutting assembly 65 is pivotally rotated counterclockwise in respect of shaft 64 by the action of cam 58 so that cutting arm 71 rises to the extent determined by the high point 91 of spiral surface 59 of cam 58. See FIG. 3. When cam follower 87 is released after passing high point 91, the action of torsion spring 88 causes cutting assembly 65 to rotate clockwise to cause cutting arm 71 to descend in a chopping motion to cut the specimen in the manner described hereinafter.

The tension or torsion spring 88 is adjustable by means of a tension control knob 92 mounted fast by means of screw 93 on the outer end of shaft 64 that extends through wall 23 of housing 21. See FIGS. 2, 14, 15 and 16. At least one off-center longitudinal pin 94 extends through suitably aligned apertures in shaft 64 and knob 92, respectively, whereby the unitary rotation of said knob and said shaft is ensured. Positioned coaxially around knob 92 is a knurled ring 96 having an axial circular aperture which slidably cooperates with outwardly extending circular flange 97 of knob 92. Ring 96 has an annular inwardly extending circular flange 98 whose circular aperture slidably cooperates with the circular surface of knob 92. Ring 96 is slidable longitudinally relative to knob 92, the outward movement being limited by a circular shoulder of flange 98 abutting the inner shoulder of flange 97. Ring 96 is normally urged inwardly toward wall 23 by means of coil spring 99, one end of which bears against flange 96, the other end of which bears against the inner shoulder of flange 98 of ring 96.

Extending off-center and longitudinally through flange 97 of knob 92 and through flange 98 of ring 96 is a pair of pins 101, located 180° apart, said flange 98 being slidable along said pins which provide for simultaneous rotation of knob 92 when ring 96 is rotated. Ring 96 has an off-center longitudinal aperture 102 in which is mounted locating pin 103 which is positionable in any selected one of several recesses 104 arrayed coaxially in a circle in wall 23 around shaft 64. Pin 103 is retractable from any one of said recesses 104 by the retraction of ring 96 against the action of spring 99.

The manual rotation of retracted ring 96 causes the simultaneous rotation of knob 92 and shaft 64 whereby the rotation of anchoring screw 90 increases or decreases the tension of torsion spring 88 depending upon the direction of rotation. In one embodiment, as shown in FIGS. 14, 15 and 16, wall 23 is provided with seven spaced recesses 104 in circular array at graduated intervals into which pin 103 may be inserted selectively whereby the operator can determine the strength of the force of the downward motion of cutting arm 71, depending upon the particular type of tissue to be cut. Holes 104 are designated by a series of calibrations from 0 to 6, for convenience in selection and to record a setting for a particular type of tissue processed by the apparatus. The higher the setting, the greater the speed and force with which arm 71 descends in its cutting action.

Torsion spring 88 also serves the purpose of continuously urging the cutting arm assembly 65 toward wall 23 of the apparatus, thereby preventing lost motion and assuring the accuracy of the cutting knife mounted on cutting arm 71.

In order to reduce or substantially eliminate chattering, bounce or vibration of cutting assembly 65, particularly when cam follower insert 87 falls off high point 91 of cam 58, vibration damping means are provided, as shown in FIGS. 2, 3, 17 and 18. Journal 67 has a rearwardly extending integrally formed arm 107 to which is pivotally connected by means of dowel pin 108 one end of a downwardly extending link 109, the other end of which is connected pivotally by means of dowel pin 111 to arm 112 of a one-way clutch, generally designated 113. The mounting for clutch 113 comprises a stub 114 mounted fast in wall 24, said stub extending inwardly and terminating in a circular plate 116 to which is axially connected an inwardly extending shaft 117. Mounted fast on plate 116 is a circular friction clutch disc 118 made of leather or other suitable friction material. Coaxially surrounding shaft 117 is the inner race 119 of a sprag clutch housing 120, one end of said race being formed in a generally circular flange acting as a pressure plate 121 whose perimeter is coextensive and coaxial with disc 118 against which it bears frictionally. Surrounding inner race 119 is a coaxial outer sprag cylinder or race 122 having conventional curved uniformly spaced apart sprag projections between which are located a plurality of rocker pins 123 which perform their locking action in conjunction therewith in the conventional manner.

Arm 112 is an integral part of clutch housing 120 whereby clockwise rotation of said arm is accompanied by similar rotation of housing 120 and the outer sprag race 122 whereby pins 123 are urged into position to rotate inner race 119 and pressure plate 121. Counterclockwise rotation of arm 112 is accompanied only by the similar rotation of clutch housing 120 and outer race 122, but during this counterclockwise rotation pins 123 are inactivated and do not produce any rotation on the part of inner race 119 and pressure plate 121.

Mounted axially in the free end of shaft 117 is an adjustment screw 124 whose threaded portion extends freely also through an axial aperture of circular pressure cap 126. Pressure cap 126 may be provided with an integrally formed collar 127 which surrounds and is spaced apart from the end of shaft 117. The circular space between collar 127 and shaft 117 is occupied by a coil spring 128, one end of which bears against cap 126, the other end of which bears against inner race 119 of clutch 113. The tightening or loosening of adjustment screw 124 increases or decreases correspondingly the pressure between plate 121 and clutch disc 118 to produce the desired frictional engagement therebetween as necessitated by the requirement to eliminate vibration of cutting assembly 65.

When cam follower insert 87 falls off high point 91 of cam 58 which rotates at uniform speed, resistance is exerted by clutch 113 against the upward stroke of cutting arm 71 thereby eliminating chattering and vibration of the cutting blade connected to said cutting arm. The appropriate adjustment of screw 124 provides the necessary resistance to be exerted by clutch 113 as may be determined by empirical means.

Positioned on the forward end portion of cutting arm 71 is a cutting blade mounting assembly, as shown in FIGS. 1, 3, 3a and 4, comprising a knife retainer, generally designated 131, formed of a plate 132, an integrally formed perpendicular leg 133, and an obliquely extending second leg 134, leg 133 bearing against a side wall of cutting arm 71, while the end of leg 134 bears against cutting knife 136 which is held firmly against cutting arm 71 by means of a nut 137 which threadably engages pin 138 located in cutting arm 71. Cutting knife 136 is typified by an injector-type razor blade and is located against the wall of cutting arm 71 at a suitable angle whereby its beveled surface 139 is arrayed vertically for reasons as will be explained hereinafter. The surface 141 of arm 71 against which knife 136 abuts is arrayed at an angle from the true vertical in order to bring about the vertical positioning of bevel surface 139.

The upper horizontal edge of knife 136 bears against the bottom edge of back stop plate 142 located against surface 141 of cutting arm 71, said plate 142 having a central aperture, not shown, through which pin 138 extends freely. Plate 142 has a pair of spaced apart threaded apertures 143 which are engageable by respective cap screws 144 extending freely through respective spaced apertures 146 in arm 71. The heads 147 of screws 144 bear against suitable shoulders in apertures 146 whereby plate 142 is secured firmly in position. The respective dimensions of screws 144, heads 147 and apertures 146 are selected so that plate 142 may be adjustably fixed in position whereby the cutting edge of knife 136 may be adjusted to ensure that it is parallel to the specimen holding table at the end of each cutting stroke of arm 71.

Mounted fast on the end of shaft 54 extending outwardly from wall 24 is a cutting arm positioning knob 148 which is manipulated when specimens are to be changed and cutting knives are to be replaced at a time when motor 44 is not operating. See FIGS. 2, 3 and 5. Manual rotation of knob 148 causes the rotation of shaft 54 and of cam 58 whereby the latter causes cutting arm 71 to rise and remain in a raised position so that the operator may perform the necessary replacement operations. An index mark 149 may be engraved or otherwise applied to knob 148 to provide a visual indication by coincidence with another index mark, not shown, on wall 24 that cam 58 has approached close to its high point 91 where rotation of knob 148 is stopped and cutting arm 71 is maintained in the upward retracted position. In some embodiments a suitable friction bearing may be provided for shaft 54 whereby the latter will remain in the position to which it is rotated by knob 148 for ease of replacing and adjusting knives and replacing specimens.

Secured transversely between walls 23 and 24 near the forward portion of housing 21 is a pair of spaced apart substantially parallel support guide rods 151 and 152 of circular cross-section. Movably mounted on guide rods 151 and 152 is a carriage 153 formed of a casting made of aluminum or a suitable alloy of aluminum or steel. See FIGS. 2, 3, 4, 8, 9 and 11. The bottom portion of carriage 153 has a transverse horizontal flat bearing surface 154 which rides freely along the top of rod 151. Carriage 153 also has a pair of transverse bearing faces 156 and 157 arrayed at an inverted V-angle relative to each other, said bearing faces resting upon and moving along respective surfaces of guide rod 152.

Bearing faces 156 and 157 are machined with the requisite degree of accuracy relative to the accurate round surface of guide rod 152 which obviates the necessity of aligning rods 151 and 152 in an absolutely perfect parallel array. At the same time there is ensured a reproducibly accurate rectilinear motion on the part of carriage 153 which rests by gravity on rods 151 and 152.

Located between and substantially parallel with guide rods 151 and 152 is a rotatable lead screw 158, one end of which is journalled in wall 24. Mounted in wall 23 is a cup-shaped journal housing 159 in the axial center of which is located a pin 161 having an inwardly extending anvil head 162. The end of lead screw is spaced apart from the face of anvil 162 and has an axial recessed seat accommodating a portion of bearing ball 163 which is urged against said anvil. See FIG. 11. Captive bearing ball 163 and its mounting determine the axial center of the rotatable lead screw 158 and provides precision control therefor. Located between the end of lead screw 158 and journal housing 159 is a sleeve bearing 164 made of a suitable material such as bronze or the like. The central portion of lead screw 158 has a plurality of fine screw threads 165 whose function will be described hereinafter.

Integrally formed on the rear and forward end portions of carriage 153 are respective pairs of downwardly extending spaced apart legs 166 and 167. Pivotally connected between legs 166 by means of pin 168 is one end of arm 169 of an L-shaped carriage nut lever 171, the outer end of which terminates in a knobbed handle 172 extending through aperture 43 in front end wall 27. The portion of lever 171 near handle 172 is movable vertically between legs 167 of carriage 153, said legs 167 serving to guide the pivoting action of said lever. See FIGS. 3, 4, 8, 9 and 11.

Mounted on top of the middle portion of lever 171 and connected thereto by bolts 173 is nut 174, the top of which has a semi-circular longitudinal threaded recess 176 adapted to cooperate with threads 165 of lead screw 158. The threads of nut 174 are normally urged into engagement with threads 165 of lead screw 158 by the action of blade spring 177 mounted on pins 178 and 179 connected between pairs of legs 166 and 167, respectively, of carriage 153. Lever 171 has a downwardly extending boss 181 which is engaged by and is normally urged upwardly by spring blade 177, which is normally bowed upwardly, as shown in FIG. 8.

When it is desired to disengage nut 174 from threaded lead screw 158, handle 172 is depressed to cause lever 171 to move pivotally downwardly on pin 168 thereby retracting said nut from said lead screw. The bottom central portion of carriage 153 has a laterally extending semicircular recess 182 whose surface is spaced apart from lead screw 158 in order to permit free movement therebetween when nut 174 is retracted from said screw. The only physical engagement between carriage 153 and lead screw 158 is by way of nut 174 engaging screw threads 176.

Carriage 153 has two spaced apart pairs of integrally formed downwardly extending spaced apart inner legs 183 between which nut 174 and lever 171 are guided for pivoting movement, as shown in FIG. 11. Pairs of legs 183 are located between pairs of legs 166 and 167, while the space between the legs of each of said leg pairs is substantially equal.

Connected to the front wall of carriage 153 in the region of leg 167 is one end of a carriage return spring 184, the other end of which is connected to wall 23, whereby said spring normally urges said carriage to move freely toward wall 23 when nut 174 is retracted from lead screw 158. See FIGS. 2, 3 and 4. Shoulder 186 of the carriage abuts the inner surface of wall 23 when it is at the starting position prior to its traverse during the cutting action of the apparatus when nut 174 engages lead screw 158. Return spring 184 also performs the function of eliminating lost motion in the action between threads 176 of nut 174 and threads 165 of lead screw 158.

Carriage 153 is moved in small predetermined increments from wall 23 to wall 24 against the action of spring 184 by means of an intermittent actuating mechanism which comprises a gear 187 mounted fast by means of its hub 188 on lead screw 158. See FIGS. 2, 4, 6 and 11. The side of carriage 153 is suitably recessed to bypass gear 187 and hub 188 when shoulder 186 of said carriage abuts wall 23. See FIG. 11. Gear wheel 187 is mounted around lead screw 158 by way of a one-way sprag clutch 189 therebetween, whereby rotary motion is imparted by said gear to said lead screw in one direction only during which time carriage 153 is caused to move from wall 23 to wall 24. See FIG. 6.

Pivotally mounted on pin 191 in wall 23 is a bell crank 192 which has a downwardly extending arm 193 in the forked end portion of which is a pivot pin 194 to which is connected one end of an elongated toothed rack 196. See FIGS. 2, 6 and 7. The teeth on the forward portion of rack 196 are engageable with teeth 197 on gear wheel 187.

Rack 196 is held in operative engagement with teeth 197 of gear 187 by means of an elongated backlash bracket 198, at the upper end of which is an integrally formed hook 199 that extends over the top edge of rack 196 and engages the teeth thereof at an angle. The lower end of backlash bracket 198 is connected to one end of spring 201, the other end of which is connected to a vertical post 202 mounted in floor 22 of base 21. Spring 201 skews backlash bracket 198 at an angle relative to rack 196 whereby hook 199 engages the teeth of said rack and normally urges the portion thereof that cooperates with gear teeth 197 of wheel 187 into engagement therewith. By this means, backlash and lost motion between rack 196 and gear wheel 187 are substantially eliminated. It will be noted that gear teeth 197 are recessed from the peripheral edge of wheel 187 thereby forming circular parallel flanges between which rack 196 is tracked and guided in its rectilinear motion. See also FIG. 11.

Rectilinear motion of rack 196 is produced by the action of bell crank 192 when the latter is moved pivotally by circular cam 203 which is eccentrically mounted on shaft 54. The peripheral surface of cam 203 bears against a low friction wear plate 204 made of Teflon or the like mounted in arm 193 of bell crank 192.

As rack 196 moves rearwardly from front wall 27, gear wheel 187 is rotated to produce rotation of lead screw 158 to cause carriage 153 to move a predetermined incremental distance in the direction from wall 23 to wall 24. The magnitude of the incremental motion of carriage 153 is determined by the length of the rearward stroke of rack 196 which, in turn, is determined by a thickness control cam 206 having a spiral shaped camming surface 207, said cam being mounted fast on pin 208 rotatably extending through wall 23. The rotation of cam 206 is limited by the action of a laterally extending stop pin 209 mounted in a side wall of cam 206, said pin cooperating with the edge of an L-shaped stop bracket 211 secured by screw 212 or the like to the inner surface of wall 23. See FIGS. 2, 6 and 7.

Bell crank 192 has a substantially horizontal rearwardly extending cam follower arm 213 on the free end of which is mounted a cam follower 214 made of a suitable low friction material such as Teflon or the like, said cam follower cooperating with the spiral curved cam surface 207 of cam 206. By determining the particular position of the cam surface 207 upon which cam follower 214 rests, the extent of the operative rearward stroke of rack 196 is determined. Accordingly, cam 206 is rotated to the desired position by means of thickness control knob 216 located on the outer surface of wall 23 and connected to the outer end of shaft 208 (FIG. 2), said knob having a series of graduations 217 etched or otherwise applied thereon to indicate the desired thickness of the tissue section to be cut by knife 136. Graduations 217 are calibrated in microns, as for example, from 5 to 230 microns in one embodiment of the apparatus.

A suitable index line, not shown, is etched or otherwise applied to the outer surface of wall 23 with which the desired graduation mark may be aligned. The calibrations 217 are coordinated with the curvature of cam surface 207 which, in turn, is coordinated with threads 165 on screw 158 so that accurate and controlled traverse or carriage 153 is readily predetermined by the operator. The magnitude of the traverse increments of carriage 153 may also be readily changed at will from time to time by rotating knob 216 during the operation of the apparatus if such action is necessary or desired.

Although pin 208 is readily rotatable by knob 216, nevertheless said pin is mounted with a requisite frictional resistance to rotation whereby, once cam 206 is rotated to a desired position, said cam will remain in that position without drift so that a constantly uniform retraction of rack 196 will be effected.

Also, cam 203 is mounted on shaft 54 in respect of cam 58 whereby the former does not bring about any retracting power stroke on the part of rack 196 when cam follower 86 of cutting arm assembly 65 falls off high point 91 of cam 58. Thus, when knife 136 is performing its cutting stroke on the specimen, carriage 153 remains stationary. The motion of cutting arm 71 describes a path substantially perpendicular to the traverse path of carriage 153.

In FIG. 6, cam 206 has been fixed in a position where the high portion of cam surface 207 is located beneath cam follower 214, thereby retracting arm 193 of bell crank 192 from the axial center of shaft 54 upon which eccentric cam 203 rotates. In these circumstances, as cam 203 rotates, it causes only a small pivoting action on the part of bell crank 192, thereby producing a short retracting power stroke on the part of rack 196 as evidenced by the short distance between follower 214 and cam surface 207. In FIG. 7, where cam 206 is positioned with the low portion of cam surface 207 located beneath cam follower 214, eccentric cam 203 will produce a large pivoting action on the part of bell crank 192, thereby producing a long retracting power stroke on the part of rack 196. Thus, the extent of rotation of lead screw 158 is proportional to the length of the retracting stroke of rack 196, whereby the extent of the intermittent traverse of carriage 153 from wall 23 to wall 24 is proportionally controlled. By this means, the thickness of the tissue cut by knife 136 may be controlled between thin (FIG. 6) and thick (FIG. 7) sections in virtually infinite gradations between the two extremes of the high and low areas of cam surface 207 of cam 206.

The return forward stroke of rack 196 toward front wall 27 produces no rotation on the part of lead screw 158 since gear wheel 187 idles in its reverse rotation in respect of said screw by virtue of one-way clutch 189.

If, by accident, gear 187 or carriage 153 is jammed, and the forward power stroke of rack 196 meets with resistance, further motion of bell chank 192 causes spring 201 to yield whereby backlash bracket 198 moves downwardly and automatically releases rack 196 from teeth 197 of gear wheel 187, thereby providing a safety factor for the operation of the apparatus.

As shown in FIGS. 1, 2, 3, 4, 11, 12 and 13, the specimen stage assembly is mounted on carriage 153 by means of a circular block 216' firmly secured to said carriage by screw 217'. Block 216' is movable from side to side of the apparatus through a suitable transverse slot 218 in deck 36 of cover 28. See FIG. 3. Mounted coaxially around block 216 is a circular shelf 219 which acts as a protective barrier in preventing material from falling through slot 218 in deck 36. Connected coaxially to the top of block 216' above shelf 219 is a circular stage 221 which has an annular recess 222 accommodating a circular expansion spring clamp 223 whose ends terminate in integrally formed handles 224.

Located on the top horizontal surface of stage 221 is a circular plastic stage disc 226 made of stiff polyethylene material or the like and which, nevertheless, has a modicum of resilience.

Positioned around stage 221 is a circular clamp ring, generally designated 227, having a vertical wall 228, a lower inwardly extending flange 229, and an upper inwardly extending flange 231. One portion of wall 228 and of flange 229 have a joint aperture 232 through which the end portions 223 of spring clamp 223 extend and which permit lowering and lifting of ring 227 in respect of said clamp.

When stage disc 226 is to be secured firmly on stage 221, handles 224 of spring clamp 223 are pressed together so that the circular portion of said clamp is retracted further into recess 222 to permit the lowering of clamp ring 227 upon said stage until flange 231 rests upon said stage disc. Thereafter, handles 224 are released permitting the spring energy of clamp 223 to enlarge its circular diameter whereby said clamp is urged outwardly against the inner upper edge of flange 229 in such a manner as to cause said clamp ring 227 to be locked onto stage 221. The expansion of spring 223 also produces a downward biasing action on clamp ring 227 whereby flange 231 urges stage disc 226 downwardly upon stage 221 and retains it firmly in position. Removal of clamp ring 227 is accomplished by pressing handles 224 together whereby clamp 223 is retracted into recess 222 releasing flange 229 and permitting the lifting of said ring from stage 221. By this means, stage disc 226 may be cleaned or replaced at will.

Mounted near the left side of front wall 27 of housing 21 is a motor switch button 236 which operates a power switch 237 mounted on the rear surface of wall 27. Switch 237 is connected by suitable wiring between a source of electric power 238 and motor speed control 47 by means well known in the electrical art. See FIGS. 1, 2 and 19. Connected in the circuit of switch 237 is a power light 239 which is mounted above switch button 236 in wall 27. Switch 237 is a momentary on-off switch of the "push-push" type which, each time button 236 is depressed, turns the circuit on and off, successively. When light 239 is illuminated, it indicates that the power circuit is closed.

Mounted near the right side of front wall 27 is a momentary action reset switch button 241 which has a plunger 242 extending rearwardly of wall 27 to operate reset microswitch 243 mounted on a suitable bracket 244 located and extending inwardly from the inner surface of wall 24. See FIGS. 2, 3, 4, 9 and 10.

Microswitch 243 has a forwardly extending circuit closing button 246 located opposite reset button 242 and is actuated thereby to close the switch circuit. Microswitch 243 has a rearwardly extending shut-off button 247 which is actuated by a laterally extending switch arm 248 which is pivotally connected to the rear wall of switch 243, the free end of said arm terminating near wall 24. See FIGS. 2, 9 and 10.

Mounted on the front surface of carriage 153 at the side nearest wall 24 is a bracket 249 having a horizontal integrally formed rearwardly extending arm 251 which, in turn, terminates in a downwardly extending shut-off trip lever 252. Formed on the bottom portion of shut-off lever 252 is a rearwardly flaring wing 253 which, as carriage 153 approaches wall 24, engages the outer free end portion of switch arm 248 whereby the latter is caused to depress shut-off button 247 of microswitch 243.

Mounted on the forward surface of a leg 167 of carriage 153 is a downwardly extending bracket 255 having a horizontally extending guard element 256. Bracket 255 and guard element are made of a stiff unyielding material such as steel or the like. When carriage 153 has reached the proximity of wall 24, guard element 256 has reached a position where it is interposed between plunger 242 and circuit closing button 246. See FIGS. 3, 9 and 10. Therefore, when carriage 153 is at the end of its traverse at or near wall 24, trip lever 252 has automatically actuated switch 243 and turned off motor 44 and stopped the rotation of lead screw 158. In this position, guard element 256 prevents any accidental reactivation of the motor circuit that would cause rotation of said lead screw and consequent stripping of screw threads 165 and nut threads 176. The depression of reset button 241 in these circumstances would be ineffectual since plunger 242 would be prevented by guard 256 from actuating reset button 246 of switch 243.

Located in front wall 27 above reset button 241 is a limit light 257 connected in the circuit between switch 243 and motor and speed control 47 by means well known in the art. See FIGS. 1, 2 and 19. When the apparatus is in operation, both the power light 239 and limit light 257 are illuminated. When carriage 153 has reached the limit of its traverse at a predetermined position prior to reaching and abutting wall 24, the opening of the circuit of microswitch 243 will open the circuit of limit light 257 which becomes extinguished and of motor control 47 which will stop motor 44 thereby stopping the operation of the whole apparatus. Nevertheless, the power circuit will remain closed as indicated by the continued illumination of power light 239. Motor 44 can be reactivated to restart the operation of the apparatus only by depressing the knob of handle 172 to retract floating nut 174 from lead screw 158 whereby spring 184 automatically urges carriage 153 toward its starting position near wall 23. This return movement of carriage 153 withdraws guard 256 from between plunger 242 and reset button 246 of switch 243 thereby permitting the reactivation of motor 44 and of the cutting operation of the apparatus.

By providing for the combination of the power switch 237 and automatically operated reset switch 243 in the power and motor circuits, respectively, with the reset switch being prevented from reactivation when the limit of traverse is reached for carriage 153, a safety factor is included for obviating accidental damage to the apparatus.

OPERATION

Before the apparatus is placed in actual cutting operation, a sheet of relatively non-porous filter paper, such as Whatman's Filter Paper No. 1, not shown, is placed on top of polyethylene stage disc 226 and is locked in place therewith by flange 231 of clamp ring 227.

Blade 136 is adjusted in its mounting on cutting arm 71 to ensure that its cutting edge is parallel to the surface of stage disc 226 at the end of each stroke. This is accomplished by permitting the knife 136 to descend to its lowest position by manipulation of knob 148. Adjustment knob 83 is rotated to retract pad 81 upwardly so that the edge of knife 136 rests completely on the surface of the filter paper laid flat on disc 226. Then, loosening screws 147 on cutting arm 71 together with locking screw 137, the edge of blade 136 will automatically assume the required position with backstop block 142 yieldably adjusting itself to that position. Thereafter, screws 147 and 137 are tightened to secure blade 136 firmly in the correct position.

Adjustment knob 83 is then turned very slightly to lower stop pad 81 thereby rotating the cutting assembly 65 very slightly in order to retract the cutting edge of knife 136 clear of the filter paper by a very small amount. Then knob 85 is rotated to lock shaft 78 in position so that stop pad 81 is also locked in position to limit the downward motion of knife 136 as predetermined by the adjustment procedure.

By this means, the knife edge is prevented from being destroyed by repeatedly striking against the cutting table represented by disc 226. After the adjustment has been carried out and the knife set at its lowest operable position, the edge of knife 136 will be approximately one millimeter above the table surface.

The stage assembly of the apparatus is prepared for sectioning by applying by means of a suitable cement a relatively non-porous filter paper, such as Whatman's Filter Paper No. 1, upon the top surface of stage disc 226, said filter paper being locked into place along with said disc by means of flange 231 of clamp ring 227. A suitable sample-holding material, such as agar, is spread on the filter paper. Lever 172 is depressed to cause the stage to be moved to the extreme left under the action of spring 184. During this procedure, cutting arm 71 has been raised to its highest position by manipulating knob 148.

The specimen which has been embedded in a block of solid agar is placed upon the filter paper sheet on disc stage 226 in a position where it is located to the left of blade 136 as viewed from the front of the instrument (FIG. 4). The specimen block is then completely coated with additional holding material, such as agar, which enhances specimen rigidity, prevents the knife 136 from lifting the specimen strip, and ensures that the cut sections do not scatter under the rapid action of the knife blade. It will be noted that wall 141 of cutting arm 71 is disposed at a slight angle from the vertical such as, for example, 5° in one embodiment, whereby bevel surface 139 of blade 136 is disposed perpendicularly to the surface of the cutting table represented by the top surface of disc 226. Thus, the specimen will receive a vertical cut and will not be disturbed or distorted while the cut slices will be urged away to the right from the specimen block by the other bevel surface of the knife edge opposite bevel surface 139. By this means, section reproducibility is ensured while, at the same time, the succeeding sections are readily separated from each other.

The thickness of sections cut by knife 136 may be adjusted from approximately 5 microns to 230 microns by rotating knob 216 which controls the stroke of rack 196 which, in turn, determines the extent to which lead screw 158 rotates to determine the traverse distance of carriage 153 and, accordingly, of the stage disc 226 upon which the specimen is resting.

The operating speed of the apparatus is adjusted by manipulating knob 51 to produce a desired or suitable cutting speed that is variable, in one embodiment, from approximately 50–200 strokes per minute on the part of cutting arm 71. As indicated hereinbefore, cutting arm cam 58 is operative to produce a downward cutting stroke of arm 71 while the stage upon which the specimen rests remains stationary. The latter condition is brought about by the fact that when carriage 153 is stationary, rack 196 is performing its forward return non-operating stroke as determined by the eccentricity of cam 203 on shaft 54 which also rotates cam 58. Cam 203 is operative upon bell crank 192 to produce a rearward power stroke on the part of rack 196 only after cutting arm 71 has risen to an extent sufficient to raise the cutting edge of knife 136 from the path of the agar block in which the specimen is embedded. The intermittent movement of carriage 153 carrying stage disc 226 is cordinated with the intermittent cutting action of arm 71 whereby the operative action of one of said components does not interfere with the operative action of the other of said components. The successive cutting actions alternate with the successive stage movements.

After the specimen has been positioned upon the stage, the desired speed adjusted, and the thickness of cut determined, power switch button 236 is depressed to connect the apparatus to the electrical source of power. Thereafter, reset switch button 241 is depressed to close the circuit between the power circuit and the motor control circuit 47 at which time the apparatus begins to operate and to cut slices from the specimen block. The cutting action of the apparatus can be stopped at any time by pressing power switch button 236. If the power switch button 236 is not depressed to stop the apparatus, the latter will automatically stop when carriage 153 reaches a point near wall 24 when shut-off lever 252 engages switch arm 248 to operate microswitch 243 to open the circuit of motor control 47, thereby preventing accidental jamming of carriage 153 against wall 24 which would otherwise strip threads 164 of lead screw 158 and threads 176 of nut 174.

At the end of the cutting stage traverse which is approximately 25 mm., the block of embedded specimen has been cut into slices which can then be removed for further laboratory or clinical analysis, or other processing.

Thereafter, stage disc 226 is removed from the apparatus by fingertip pressure upon the two handles 224 of spring 223 which permits the removal of ring clamp 227 to release said disc from the apparatus. With frequent use of the apparatus, it is advantageous to prepare several stage discs 226 in advance with the filter paper layer applied on the top surface thereof with the agar embedded specimen located centrally on the filter paper after which agar solution is pipetted over the specimen and allowed to flood onto the filter paper. This advance preparation may then be set to one side to harden or, if desired, it may be refrigerated for a short period. Thus, by means of the rapid replaceability of stage disc 226, considerable time may be saved in processing a greater number of specimens.

Depending upon the toughness of the tissue embedded in the specimen block, the power of the cutting stroke of cutting arm 71 may be adjusted by adjusting the tension on torsion spring 88 by the manipulation of knob 92 and ring 96 as described hereinbefore.

It is to be understood that the apparatus described hereinbefore and defined hereinafter by the claims is not limited to the cutting of thin sections of biological tissues but that it is contemplated that the apparatus may be used for other purposes where a carriage or table is moved intermittently from one side of a frame to another while an oscillating element is moved pivotally toward and away from the carriage or table and to coact therewith only when the latter is at rest between interment movements.

I claim:

1. Apparatus for cutting biological materials and the like into thin sections, comprising a frame, a stage movable transversely in steps from one side of said frame to the other side thereof, a pivotable cutting assembly on said frame movable substantially perpendicularly and reciprocably in respect of the transverse path of said stage, a cutting arm on said assembly movable towards said stage each time the latter is stationary between stepping movements and away from said stage when said stage moves, a rotatable drive shaft on said frame, first and second cams on said shaft, said first cam being operative alternately to engage and release said cutting assembly to produce repeated pivoting actions thereon, a linkage between said second cam and said stage to produce said stepping movement of said stage, a leg on said cutting assembly, and a stop element on said frame with which said leg cooperates to limit the motion of said cutting arm toward said stage.

2. Apparatus according to claim 1 and further comprising a screw mounting for said stop element to adjust the position thereof to a predetermined location.

3. Apparatus according to claim 1 and further means on said frame connected to said cutting assembly for damping the stroke of said cutting arm as the latter moves away from said cutting stage.

4. Apparatus according to claim 3 wherein said damping means comprises a clutch connected between said cutting assembly and said frame, said clutch being operable on only one direction of movement of the pivoting action of said assembly.

5. Apparatus according to claim 4 and further comprising means for adjusting the tension on said clutch to prevent vibration of said cutting arm when the latter moves away from said cutting stage.

6. Apparatus according to claim 1 and further comprising a cutting assembly shaft around which said cutting assembly is movable pivotably, a torsion spring connected between said cutting assembly shaft and said cutting assembly, said cutting assembly shaft being independently movable rotatable into any one of several selected positions for varying the tension on said torsion spring and for correspondingly varying the force with which said cutting assembly moves pivotably each time said assembly is released by said first cam.

7. Apparatus according to claim 6 and further comprising a knob connected to said cutting assembly shaft, a plurality of spaced apart means on said frame located coaxially around said shaft and means on said knob cooperating with any one of said coaxial means on said frame to position said shaft in a selected relationship relative to said cutting assembly for determining the tension of said torsion spring.

8. Apparatus according to claim 1 wherein the cutting arm assembly mounting comprises a shaft mounted transversely in said frame, three spaced apart journals axially surrounding said shaft and rotatable freely relative thereto, a forwardly extending cutting arm integrally joined with the center journal, means intermediate the ends of said cutting arm connecting the latter rigidly with the two outer journals, said three journals being connected to each other by at least one longitudinal element to cause said three journals to rotate in unison, and a torsion spring coiled around said shaft, one end of said torsion spring being connected to said shaft, the other end of said torsion spring being connected to the central journal.

9. Apparatus for cutting biological materials into thin sections, comprising a frame, a knife lever pivotally mounted on said frame, a knife mounted on one end of said lever, means for intermittently and reciprocably moving said knife lever pivotally, a cutting stage assembly on said frame and movable transversely in relation to the cutting motion of said knife lever, a threaded screw on said frame mounted parallel to the plane in which said cutting stage assembly moves, a threaded nut pivotally connected to said assembly and releasably engaging said screw, means for disengaging said nut from said screw, and spring biasing means connected between said cutting stage assembly and said frame for normally moving said assembly toward one side of said frame when said screw is released by said nut.

10. Apparatus according to claim 9 and further comprising a pair of spaced apart substantially parallel circular shafts, said cutting stage assembly being movable on both of said shafts from one side of said frame to the other, said threaded screw being located intermediate said shafts.

11. Apparatus according to claim 10 and further comprising a flat surface on a bottom portion of said assembly, said flat surface bearing freely and slidably on one of said shafts, and a pair of surfaces in the bottom of said cutting stage assembly, said pair of surfaces being arrayed at an inverted V-angle relative to each other, said paired surfaces bearing freely and slidably upon respective surfaces of the other shaft, the sliding cooperation of said V-angled surfaces with said other shaft providing a true rectilinear path of movement for said cutting stage assembly.

12. Apparatus according to claim 9 and further comprising an electric motor connected to said screw for causing said cutting stage assembly to move from a first wall to a second wall of said frame, an electrical circuit for said motor, a power circuit, a first switch on said frame for turning said power circuit on and off, a motor circuit, a second switch connecting said motor circuit to said power circuit, a manual actuator for operating said second switch to close the motor circuit, means mounted on said cutting stage assembly cooperating with said second switch to cause the opening of said motor circuit when said cutting stage assembly reaches a predetermined location relative to the second wall of said frame.

13. Apparatus according to claim 12 and further comprising a guard element mounted on said cutting stage assembly, said guard element being located between said manual actuator and said second switch to prevent the operation of said switch by said manual actuator when said cutting stage assembly is at the predetermined end of its traverse relative to the second wall of said frame.

14. Apparatus for cutting biological materials into thin sections, comprising a frame, a knife lever mounted for reciprocating pivoting movement on said frame, a cutting stage on said frame movable transversely in relation to the cutting motion of said knife lever, a cutting knife, adjustable means on said lever against which said knife is located to determine the position of the cutting edge of said knife in relation to said stage, means for locking said adjustable means in position, and clamp means on said lever securing said cutting knife on said lever firmly in position against said adjustable means, said adjustable means comprising a backstop plate movably located against said lever, the bottom edge of said plate cooperating with and limiting the movement of the top edge of said knife, a pair of spaced apart threaded apertures in said backstop plate, a pair of corresponding spaced apart apertures in said lever, a pair of threaded screws movable freely through said lever apertures and engaging said backstop plate and urging the latter firmly into position in relation to said lever, said pair of screws being movable within the respective lever apertures to permit adjustment of said backstop plate into a suitable position for obtaining the desired location of said cutting knife relative to said lever whereby the cutting edge of said knife is properly located in relation to said stage.

15. Apparatus for cutting biological materials into thin sections, comprising a frame, a knife lever mounted for reciprocating pivoting movement on said frame, a cutting stage on said frame movable transversely in relation to the cutting motion of said knife lever, a cutting knife, adjustable means on said lever against which said knife is located to determine the position of the cutting edge of said knife in relation to said stage, means for locking said adjustable means in position, and clamp means on said lever securing said cutting knife on said lever firmly in position against said adjustable means, said clamp means comprising a plate, a pair of spaced apart legs on said plate, one of said legs bearing against said lever, the other of said legs bearing against said knife, and a threaded screw extending through said lever, said adjustable means, and said plate, and a nut engaging said threaded screw for urging said plate and legs firmly in position.

16. Apparatus according to claim 1 and further comprising a threaded screw on said frame mounted parallel to the plane in which said stage moves, means on said stage releaseably connecting said stage to said screw, a one-way clutch on said screw, a rack on said frame engaging said clutch by reciprocating action to impart rotation of said screw through said clutch in one direction only, means on said frame for imparting reciprocating movement on the part of said rack, a bell crank pivotally mounted on said frame, one arm of said bell crank being connected to said rack, a rotatable shaft mounted on said frame and an eccentric cam mounted on said shaft, said cam being operative upon said bell crank arm to produce the reciprocating motion of said rack.

17. Apparatus according to claim 16 and further comprising a spiral shaped cam rotatably mounted on said frame, the surface of said spiral cam cooperating with the other arm of said bell crank, said spiral cam being movable into a predetermined position relative to said other bell crank arm whereby the first mentioned arm of said bell crank is located in a predetermined position relative to said eccentric cam to control the length of the rectilinear stroke imparted to said rack.

18. Apparatus according to claim 16 and further comprising a stop element on said spiral cam and a bracket mounted on said frame, said stop element coacting with said bracket to limit the rotation of said spiral cam.

19. Apparatus according to claim 16 and further comprising a backlash bracket, one end of said bracket engaging said rack intermediate the ends thereof, a spring, one end of said spring connected to the other end of said bracket, the other end of said spring being connected to said frame, said spring and bracket combination being yieldable in the event of accidental resistance to movement of said clutch and of said stage to cause said rack yieldably to become disengaged from said gear.

20. Apparatus according to claim 1 and further comprising a circular specimen mounting stage on said carriage, an annular recess in said stage, a substantially circular clamp spring positionable with said recess, a handle on each end of said clamp spring extending outwardly from said stage, the urging together of said handles causing said clamp spring to be retracted within said recess, a circular clamp ring positionable around said stage and extending over said recess, an upper inwardly extending flange on said clamp ring and a lower inwardly extending flange on said clamp ring, said clamp spring, when released, being urged circumferentially outwardly by its expansion bias to engage said lower flange and to secure said clamp ring firmly in position on said stage.

21. Apparatus according to claim 20 and further comprising an aperture in said clamp ring through which the ends of said clamp spring extend.

22. Apparatus according to claim 20 and further comprising a circular specimen plate positionable on the top of said stage, said specimen plate being secured in position by said upper flange.

23. Apparatus according to claim 22 wherein said lower flange is disposed in a position relative to said clamp ring, whereby the outward expansion of the latter urges said ring clamp downwardly to cause said upper flange to be urged downwardly upon said specimen plate.

References Cited

UNITED STATES PATENTS

| | | | |
|---|---|---|---|
| 844,171 | 2/1907 | McAnulty | 83—700 X |
| 1,465,039 | 8/1923 | Goldstein | 83—700 X |
| 2,098,159 | 11/1937 | Peiseler | 83—700 X |
| 3,420,130 | 1/1969 | Farquhar | 83—915.5 X |

JAMES M. MEISTER, Primary Examiner

U.S. Cl. X.R.

83—248, 276, 414, 529, 587, 608, 700, 915.5